United States Patent [19]

Humphries et al.

[11] Patent Number: 5,521,884

[45] Date of Patent: May 28, 1996

[54] VIBRATING ELEMENT TRANSDUCER

[75] Inventors: James E. Humphries, Liverpool; Alan J. Jacobs-Cook; Robert A. Pinnock, both of Birmingham, all of England

[73] Assignee: Lucas Industries Public Limited Company, Solihull, England

[21] Appl. No.: 404,634

[22] Filed: Mar. 15, 1995

[30]     Foreign Application Priority Data

Mar. 18, 1994 [GB]   United Kingdom ............... 9405355

[51] Int. Cl.⁶ .............................. G01L 11/00; G01B 9/02
[52] U.S. Cl. .............................................. 367/140; 73/705
[58] Field of Search .................................. 367/140, 149; 73/705, 715; 250/227.27, 231.19; 356/358

[56]              References Cited

U.S. PATENT DOCUMENTS 5,087,124   2/1992   Smith et al. .......................... 356/358

FOREIGN PATENT DOCUMENTS 2223311   4/1990   United Kingdom.
2259239   3/1993   United Kingdom.

*Primary Examiner*—Daniel T. Pihulic
*Attorney, Agent, or Firm*—Jacobson, Price, Holman & Stern

[57]              ABSTRACT

A vibrating element transducer is provided in which a vibrating element and a substantially non-vibrating reference element are positioned side by side and illuminated via an optical fibre. The surfaces of the vibrating element and the reference element are formed at slightly different distances from the end of the optical fibre. The differing distances are arranged such that interference between the light reflected from the vibrating element and from the reference reflector can be used to determine the frequency of vibration of the vibrating element.

18 Claims, 2 Drawing Sheets

VIBRATING ELEMENT TRANSDUCER

The present invention relates to a vibrating element transducer. Such a transducer is suitable for measuring force and/or pressure.

Known vibrating element pressure transducers have a vibrating element attached to a diaphragm. The position of the vibrating element is detected by interferometry. A problem arises because the range of motion of the diaphragm is greater than the amplitude of vibration of the vibrating element. Thus the diaphragm may deflect so as to move the vibrating element to have a rest position at or adjacent a minimum in the response characteristic of the interferometer. This results in signal fading and may make measurements unreliable or unobtainable.

GB 2 259 139A describes a measuring system in which light from a broad band light source is conveyed via an optical fibre to a vibrating element. The vibrating element and the end of the optical fibre form an interferometer. Light from the interferometer is supplied to a two-arm reference interferometer in which one of the arms includes a quarter wave delay between the two polarisation states traversing that arm. Light from the reference interferometer is conveyed via a polarising beam splitter to a pair of photodetectors which provide first and second outputs which are in quadrature with one another.

GB 2 223 311A describes a solid state sensor having first and second beams attached to a diaphragm. The first beam is arranged such that its resonant frequency is affected by pressure acting on the diaphragm, whereas the second beam is arranged as a cantilever such that its resonant frequency is not affected by pressure acting on the diaphragm. The resonant frequency of the second beam is measured so as to provide temperature compensation to measurements of pressure made using the first beam.

According to a first aspect of the present invention there is provided a transducer, comprising a vibratable first member movable in response to movement of a first part of a second member, and a substantially non-vibrating reference reflector adjacent the first member and movable in response to movement of the first part of the second member, the first member having a resonant frequency which is a function of position of the first part of the second member and being arranged to cooperate with the reference reflector to form an interferometer.

It is thus possible to provide a transducer in which the first member and reference reflector move substantially in unison in response to movement of the first part of the second member, thereby ensuring that the difference in the path lengths between radiation reflected from the first member and radiation reflected from the second member is substantially unaffected by the position of the first part of the second member.

Preferably the first member is a first bridge supported on first and second supports, at least one of which is attached to the second member, such that movement of the first part of the second member alters the stress experienced by the first bridge.

Preferably the reference reflector is a second bridge supported on at least one support attached to the second member. Advantageously the second bridge is supported on at least one of the first and second supports.

Preferably the second bridge is of a different size and/or composition to the first bridge so that the resonant frequencies of the first and second bridges are different. Thus, if the first and second bridges receive a driving stimulus at the resonant frequency of the first bridge, the second bridge undergoes substantially no vibratory movement.

Alternatively the reference reflector may be attached to the second member or be a part of the second member. Thus, the reference reflector is non-vibrating.

Preferably the second member is a diaphragm and the first part of the second member is a portion of the diaphragm that moves when the diaphragm deforms under the influence of a force acting thereon. Advantageously the first member and the reference reflector are attached to a first side of the diaphragm, and a second side of the diaphragm is arranged to be exposed to a fluid whose pressure is to be measured. Pressure acting on the second side of the diaphragm deforms the diaphragm thereby altering the resonant frequency of the first member.

Preferably the transducer is of unitary construction. The diaphragm, the first member and the reference reflector may be formed by etching a block of silicon.

Preferably the first member and the reference reflector are illuminated by radiation supplied via a waveguide. Advantageously radiation reflected from the first member and the reference reflector is received by the waveguide or a further waveguide. The reflected radiations interfere and intensity modulate the radiation received by the or the further waveguide depending on the position of the first member with respect to the reference reflector. The or each waveguide may be an optical fibre.

Advantageously a predetermined difference exists between the length of a first optical path from the waveguide to the mean position (i.e. non-vibrating position) of the first member and back to the or the further waveguide, and the length of a second optical path from the waveguide to the reference reflector and back to the or the further waveguide. Advantageously the path length difference corresponds to a quarter of a wavelength of the illumination when the illumination is substantially monochromatic.

The illumination may be infrared, visible or ultraviolet light.

According to a second aspect of the present invention there is provided a pressure measuring apparatus, comprising a transducer according to a first aspect of the present invention, illumination means for illuminating the first member and reference reflector, and a photodetector responsive to the illumination reflected from the first member and reference reflector so as to provide a signal indicative of the frequency of oscillation of the first member.

Preferably the illumination means is controlled so as to amplitude modulate the illumination incident on the first member so as to maintain the first member in oscillation at its resonant frequency.

The present invention will further be described, by way of example, with reference to the accompanying drawings, in which.

Figure 1:
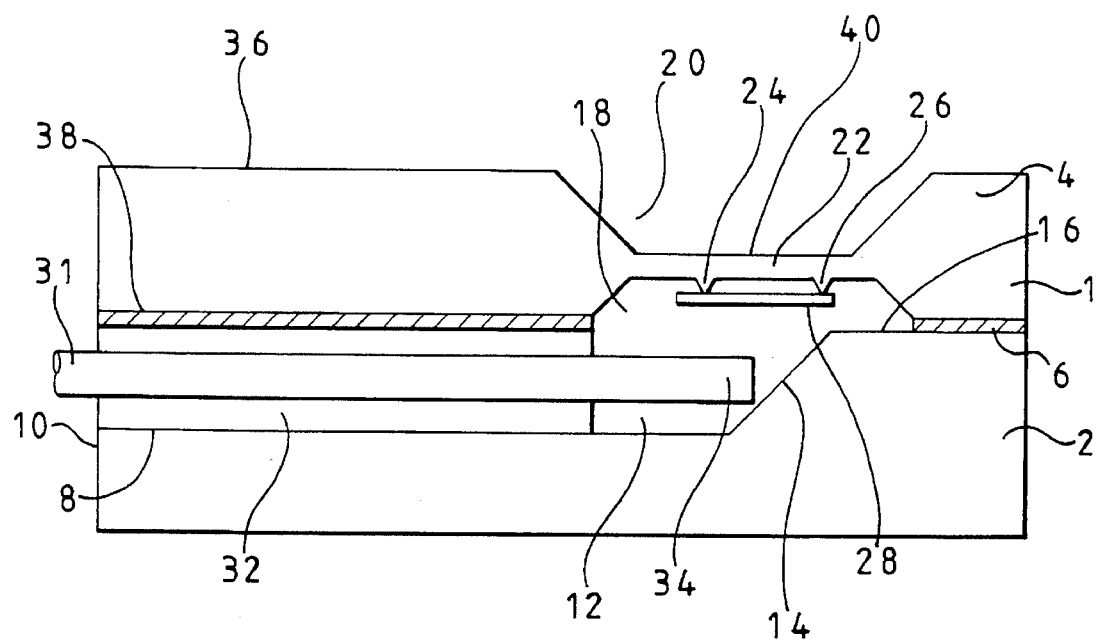
FIG. 1 is a cross section of a pressure transducer constituting a first embodiment of the present invention.

The pressure transducer 1, shown in FIG. 1, has a base portion 2 separated from an upper portion 4 by a glass spacer 6. The lower portion 2 has a V groove 8 formed therein which extends between a side wall 10 of the lower portion 2 and a recess 12 formed in the lower portion 2. An end portion of the groove 8 faces towards a reflecting wall 14 of the recess 12. The end portion of the groove 8 is parallel with an upper surface 16 of the lower portion 2 and makes an angle of 45° with the reflecting wall 14.

Figure 3:
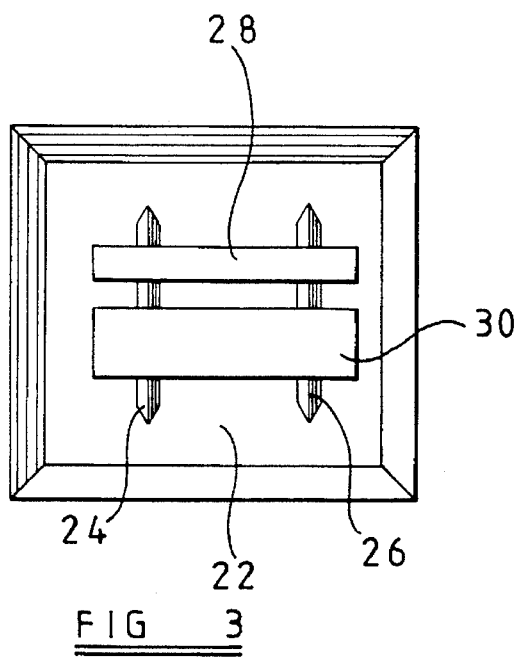
FIG. 3 is view of a diaphragm having first and second bridges formed thereon.

The upper portion 4 has two opposing recesses 18 and 20 which cooperate to define a diaphragm 22. First and second supports 24 and 26, respectively, attach a first bridge 28 to the diaphragm 22, as shown in FIG. 3. A second bridge 30 is also supported by the first and second supports 24 and 26. The second bridge 30 is wider and/or thicker and/or made of a different material to the first bridge 28, and has a resonant frequency which is different from that of the first bridge.

An optical fibre 31 is introduced into the V groove 8 and sealed therein, for example, using solder 32, such that an end 34 of the fibre 31 is adjacent the reflecting wall 14.

The upper portion 4 is secured to the lower portion 2, in an evacuated environment, such that the recesses 12 and 18 cooperate to define an evacuated chamber. The first and second bridges 28 and 30 are positioned proximate the reflecting wall 14 such that light from the fibre 31 is reflected by the wall 14 on to the first and second bridges, and that light reflected from the first and second bridges is returned to the optical fibre 30.

The groove 8, the recess 12 and the reflecting wall 14 can be formed by anisotropic etching of silicon having a {110} surface. The groove 8 has walls lying in {111} crystallographic planes and the reflective wall 14 lies in a {100} crystallographic plane. The diaphragm 22 in the upper portion 4 is formed by etching of upper and lower surfaces 36 and 38, respectively, which lie in {110} crystallographic planes. The first and second supports 24 and 26 and the first and second bridges 28 and 30 can be formed by masking areas of the lower surface 38 and boron doping the regions of the silicon which are to form the bridges 28 and 30 so as to make these regions resistant to the etch. During the etching, the etchant removes the silicon underneath the boron doped areas so as to leave the bridges 28 and 30 held on their supports 24 and 26. Techniques for forming the groove 8, recess 12, reflecting wall 14 and bridges 28 and 30 are disclosed in European Patent Application 0555968A. The upper portion 4 and lower portion 2 are secured together by electrostatic bonding to the glass spacer 6.

In use, a first surface 40 of the diaphragm 22 is exposed to a fluid whose pressure is to be measured. The pressure acting on the face 40 causes the diaphragm to deform, such that the centre section of the diaphragm moves towards the reflecting wall 14. The deformation applies a force tending to stretch the first and second bridges 28 and 30, thereby changing their resonant frequencies. The movement of the central portion of the diaphragm may be as much as 5 microns, whereas the peak-to-peak displacement of the resonator is about 10 to 50 nanometres.

This large range of movement can cause signal fading in known transducers relying on interferometry when the movement of the diaphragm causes the path difference in the interferometer to approach an integral number of half wavelengths. However, the comparatively large range of movement does not cause signal fading in embodiments of the present invention since the movement of the first bridge 28, which acts as the resonant sensor, is tracked by the movement of the second bridge 30, which acts as the reference reflector.

Light from the end 34 of the optical fibre 31 is directed towards the first and second bridges 28 and 30 via the reflecting wall 14. The first bridge 28 is arranged to vibrate at its resonant frequency and thereby phase modulates light reflected therefrom compared to the light reflected from the non-resonating second bridge 30. The light reflected from the first and second bridges undergoes interference as it enters the optical fibre 30. Thus, light returning from the transducer 1 is amplitude modulated at the resonant frequency of the first bridge 28. Furthermore, the intensity of the modulation is substantially independent of the degree of deflection experienced by the diaphragm 22.

Figure 4:
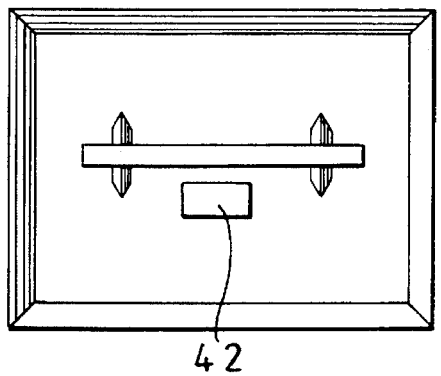
FIG. 4 is a view of a diaphragm having a first bridge and a non-vibrating reference reflector formed thereon.

In an alternative arrangement, the second bridge 30 may be omitted and a pedestal 42 may be formed on the diaphragm 22 adjacent the first bridge 28, as shown in FIG. 4. Alternatively, the surface of the diaphragm 22 may be used as the reference reflector.

Figure 2:
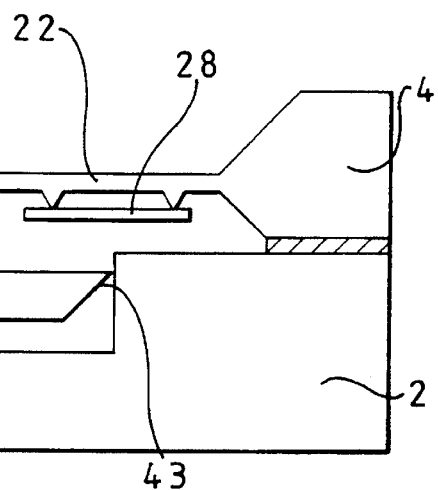
FIG. 2 is a cross section of a pressure transducer constituting a second embodiment of the present invention.

As a further alternative, the reflecting wall 14 may be omitted and the end portion 34 of the optical fibre 31 may be profiled so as to form a surface 43 for directing light to, and receiving light from, the bridges 28 and 30, as shown in FIG. 2. The surface 43 is formed at an angle of 45° with respect to the longitudinal axis of the optical fibre 31.

Figure 5:
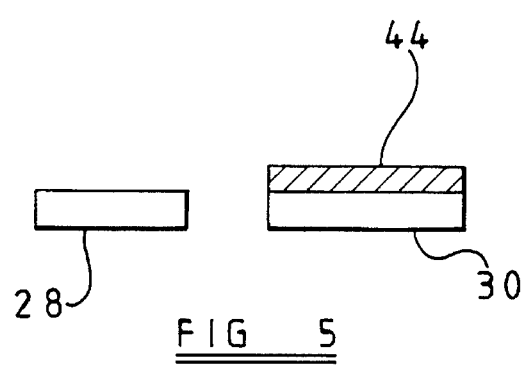
FIG. 5 is a cross-sectional view of the first and second bridges parallel to the longitudinal axes of the bridges.

It is the difference between the length of a first optical path from the end 34 of the fibre to the first bridge 28 and back again, and a second optical path from the end 34 of the fibre to the reference reflector 30 or 42 and back again, which gives rise to the interference, rather than the actual length of optical paths. The length of the first and second optical paths may be deliberately made different. For example, the height of the reference reflector with respect to the diaphragm may be selected to be approximately 100 nanometers nearer or further from the diaphragm compared to the rest (non-vibrating) position of the first bridge 28. Such a difference introduces a phase shift of approximately a quarter of a wavelength between the first and second optical paths when the transducer is illuminated with light having a wavelength of approximately 800 nanometers. Such a phase difference ensures that the transducer operates at maximum sensitivity. The difference in the path lengths may be formed by coating the reference reflector with a thin reflective layer 44, as shown in FIG. 5. The layer 44 may be a layer of metal. The difference in path lengths may also be achieved by oxidation of either the first bridge 28 or the reference reflector 30 or 42, or by oxidising both the first bridge and the reference reflector by different amounts. The oxidation consumes the silicon surface. By oxidising one surface more than the other, and then removing the oxide by etching, it is possible to produce the step in height as shown in FIG. 5. However, in this case the layer 44 would be an integral part of the reference reflector 30.

The first bridge 28 may be driven into oscillation by intensity modulating the light impinging thereon at a frequency substantially equal to the resonant frequency of the first bridge 28. The second bridge 30 is substantially unaffected since it has a resonant frequency which is different from that of the first bridge. Thus the second bridge remains substantially stationary and acts as a non-vibrating reference reflector.

It is thus possible to provide an interferometric resonant sensor which does not suffer from signal drop out.

We claim:

1. A transducer, comprising a vibratable first member, a second member having a first part, and a reference reflector, in which: said first member is movable in response to movement of said first part of said second member; said reference reflector is, in use, substantially non-vibrating, is adjacent said first member, and is movable in response to movement of said first part of said second member; and said first member has a resonant frequency which is a function of position of said first part of said second member, and is arranged to cooperate with said reference reflector to form an interferometer.

2. A transducer as claimed in claim 1, further comprising first and second supports, and in which said first member is a first bridge supported on said first and second supports, at least one of which is attached to said second member, such that movement of said first part of said second member alters a stress experienced by said first bridge.

3. A transducer as claimed in claim 2, in which said reference reflector is a second bridge supported on at least one support attached to said second member.

4. A transducer as claimed in claim 3, in which said second bridge is supported on at least one of said first and second supports.

5. A transducer as claimed in claim 3, in which said second bridge is of a different size to said first bridge such that the resonant frequencies of said first and second bridges are different.

6. A transducer as claimed in claim 3, in which said second bridge is of a different composition to said first bridge such that the resonant frequencies of said first and second bridges are different.

7. A transducer as claimed in claim 1, in which said reference reflector is a pedestal attached to said second member.

8. A transducer as claimed in claim 1, in which said reference reflector is part of said second member.

9. A transducer as claimed in claim 1, in which said second member is a diaphragm and said first part of said second member is a portion of said diaphragm that moves when said diaphragm deforms under the influence of a force acting thereon.

10. A transducer as claimed in claim 1, in which said first and second members, and said reference reflector are formed by etching a block of silicon.

11. A transducer as claimed in claim 1, further comprising a waveguide and in which said first member and said reference reflector are illuminated by radiation supplied via said waveguide and radiation reflected from said first member and said reference reflector is received by said waveguide.

12. A transducer as claimed in claim 1, further comprising first and second waveguides and in which said first member and said reference reflector are illuminated by radiation supplied via said first waveguide, and radiation reflected from said first member and said reference reflector are received by said second waveguide.

13. A transducer as claimed in claim 11, further comprising a first optical path from said waveguide to said first member and back to said waveguide, and a second optical path from said waveguide to said reference reflector and back to said waveguide, and in which there is a predetermined difference between the length of the first optical path to a mean position of said first member and the length of the second optical path.

14. A transducer as claimed in claim 13, in which said radiation is substantially monochromatic and the path difference corresponds to substantially a quarter of a wavelength of the radiation.

15. A transducer as claimed in claim 12, further comprising a first optical path from said first waveguide to said second waveguide via said first member, and a second optical path from said first waveguide to said second waveguide via said reference reflector, and in which there is a predetermined difference between the length of the first optical path to a mean position of the first member and the length of the second optical path.

16. A transducer as claimed in claim 15, in which said radiation is substantially monochromatic and the path difference corresponds to substantially a quarter of a waveguide of the radiation.

17. A pressure measuring apparatus comprising a vibratable first member, a second member having a first part, a reference reflector, a source of illumination and a photodetector, in which: said first member is movable in response to movement of said first part of said second member; said reference reflector is, in use, substantially non-vibrating, is adjacent said first member, and is movable in response to movement of said first part of said second member; said first member has a resonant frequency which is a function of position of said first part of said second member and is arranged to cooperate with said reference reflector to form an interferometer; said source of illumination is arranged to illuminate said first member and said reference reflector; and said photodetector is responsive to illumination reflected from said first member and said reference reflector so as to provide a signal indicative of the frequency of oscillation of said first member.

18. A pressure measuring apparatus as claimed in claim 17, in which said source of illumination is controlled so as to amplitude modulate the illumination incident on said first member so as to maintain said first member in oscillation at its resonant frequency.

* * * * *